(12) United States Patent
Pinto et al.

(10) Patent No.: US 8,593,541 B2
(45) Date of Patent: Nov. 26, 2013

(54) IMAGE PROCESSING UNDER FLICKERING LIGHTING CONDITIONS USING ESTIMATED ILLUMINATION PARAMETERS

(75) Inventors: Victor Pinto, Zichron-Yaakov (IL); Artemy Baxansky, Nesher (IL); Meir Tzur, Haifa (IL)

(73) Assignee: CSR Technology Inc., Sunnyvale, CA (US)

( * ) Notice: Subject to any disclaimer, the term of this patent is extended or adjusted under 35 U.S.C. 154(b) by 0 days.

(21) Appl. No.: 13/410,256

(22) Filed: Mar. 1, 2012

(65) Prior Publication Data

US 2012/0154630 A1 Jun. 21, 2012

Related U.S. Application Data

(63) Continuation of application No. 12/511,726, filed on Jul. 29, 2009, now Pat. No. 8,194,152.

(60) Provisional application No. 61/094,755, filed on Sep. 5, 2008.

(51) Int. Cl.
*H04N 9/73* (2006.01)
*H04N 5/217* (2011.01)
*G06K 9/40* (2006.01)

(52) U.S. Cl.
USPC .................. 348/228.1; 348/241; 382/274

(58) Field of Classification Search
USPC ......... 348/222.1, 226.1, 228.1, 241; 382/274, 382/275
See application file for complete search history.

(56) References Cited

U.S. PATENT DOCUMENTS

| 6,710,818 | B1 | 3/2004 | Kasahara et al. |
| 6,999,634 | B2 | 2/2006 | Hong |
| 7,920,175 | B2 * | 4/2011 | Kawarada ................. 348/226.1 |
| 2003/0081138 | A1 | 5/2003 | Hofer et al. |
| 2003/0107664 | A1 | 6/2003 | Suzuki |
| 2005/0046704 | A1 | 3/2005 | Kinoshita |
| 2008/0136934 | A1 | 6/2008 | Zhao et al. |
| 2008/0291288 | A1 | 11/2008 | Tzur et al. |
| 2009/0027508 | A1 | 1/2009 | Miki et al. |

OTHER PUBLICATIONS

Official Communication for U.S. Appl. No. 12/511,726 mailed Sep. 15, 2011.
Official Communication for U.S. Appl. No. 12/511,726 mailed Jan. 4, 2012.
International Search Report and Written Opinion for PCT/US2010/043259 mailed Nov. 15, 2010.

* cited by examiner

*Primary Examiner* — Daniel M Pasiewicz
(74) *Attorney, Agent, or Firm* — Frommer Lawrence & Haug LLP; Jamie L. Wiegand

(57) ABSTRACT

Methods for estimating illumination parameters under flickering lighting conditions are disclosed. Illumination parameters, such as phase and contrast, of a intensity-varying light source may be estimated by capturing a sequence of video images, either prior to or after a desired still image to be processed. The relative average light intensities of the adjacently-captured images are calculated and used to estimate the illumination parameters applicable to the desired still image. The estimated illumination parameters may be used to calculate the point spread function of a still image for image de-blurring processing. The estimated illumination parameters may also be used to synchronize the exposure timing of a still image to the time when there is the most light, as well as for use in motion estimation during view/video modes.

17 Claims, 3 Drawing Sheets

IMAGE PROCESSING UNDER FLICKERING LIGHTING CONDITIONS USING ESTIMATED ILLUMINATION PARAMETERS

CROSS-REFERENCE TO RELATED APPLICATION

This application is a continuation of U.S. application Ser. No. 12/511,726 filed on Jul. 29, 2009, which is a Non-Provisional of U.S. Provisional Application No. 61/094,755, filed Sep. 5, 2008, and claiming the benefit of, and further which are both incorporated herein in their entirety by this reference.

FIELD OF THE INVENTION

The present invention relates in general to image processing under flickering lighting conditions, and in particular to estimating illumination parameters under flickering lighting conditions for use in digital image processing, such as image de-blurring, exposure timing and motion estimation.

BACKGROUND

Digital cameras typically include an optical lens and light sensing integrated circuit (IC), such as a complementary metal-oxide semiconductor (CMOS) or charge-coupled device (CCD). Light sensing ICs traditionally have light sensing elements that are aligned with the image captured by the optical lens. In this fashion, the individual light sensing elements can provide a signal representative of the intensity of the light to which a particular area of the image is exposed.

However, under flickering light conditions, such as fluorescent lighting, digital camera image quality can be substantially reduced since the intensity lighting conditions are not constant. For example, known image de-blurring processing requires one to first calculate the point spread function (PSF). When the light intensity is constant over time, the PSF can be computed simply as a function of the camera motion. However, if the light source is flickering (e.g., a fluorescent lamp), the knowledge of the motion alone is insufficient for accurately calculating the PSF, as the PSF is similarly affected by illumination factors, such as the phase and the contrast of the light source.

Since digital cameras are used a large percentage of the time indoors under fluorescent lighting, there is a need in the art for image processing techniques under flickering lighting conditions, such as image de-blurring, exposure timing and/or motion estimation.

BRIEF SUMMARY OF THE INVENTION

Disclosed and claimed herein are techniques for performing image processing under flickering light conditions using estimated illumination parameters. In one embodiment, a method for performing image processing under flickering light conditions includes receiving first image data corresponding to a plurality of captured image frames captured at a first time period under flickering light conditions, and receiving second image data corresponding to a desired still image captured at a second time period under flickering light conditions. This particular method further includes estimating an illumination parameter based on the first image data, which includes calculating the relative average light intensities for each of the plurality of captured image frames.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview and Terminology

Figure 1:
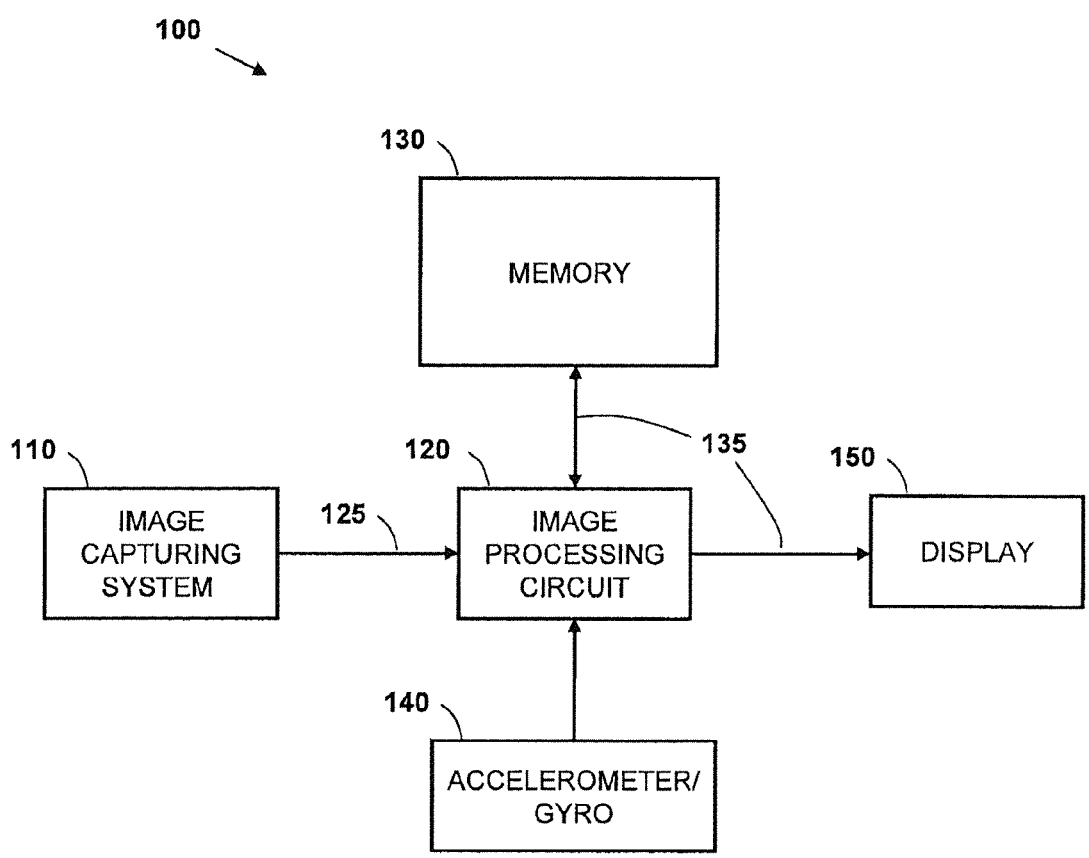
FIG. 1 depicts a simplified block diagram of a device configured to implement one or more aspects of the invention.

The present disclosure relates to image processing under flickering lighting conditions using estimated illumination parameters. As will be described in more detail herein, the illumination parameters (e.g., phase and contrast) of an intensity-varying light source may be estimated by capturing a sequence of video images, either prior to or after a desired still image to be processed, such as in the camera's preview mode. From the relative intensities of those adjacently-captured images, the illumination parameters applicable to the desired still image may be estimated.

One aspect of the disclosure is to use the estimated illumination parameters to calculate the correct PSF in a manner which accounts for the time-varying light intensity caused by fluorescent lighting. The calculated PSF may then be used to perform image de-blurring operations on the desired still image.

Another aspect of the invention is to use the aforementioned estimated illumination parameters to synchronize the exposure timing of a still image to the time when there is the most light. Still another aspect of the invention is to use the aforementioned estimated illumination parameters for motion estimation in view/video modes.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

FIG. 1 depicts a simplified block diagram of a digital camera 100 configured to implement one or more aspects of the invention. In particular, camera 100 includes an image capturing system 110. The image capturing system 110 may include any form or combination of an optical lens and a light sensing IC. As is generally known, the optical lens typically including lenses and beam splitters to form images using the incident light. The light sensing IC will typically include light sensing elements that are aligned to the images formed by the optical lens, and then convert the light sensed into corresponding electrical signals which are then provided to the image processing circuitry 120 as captured image data 125. It should be appreciated that the image processing circuitry 120 may be implemented using one or more integrated circuit microprocessors, microcontrollers and/or digital signal processors.

Image processing circuitry 120 may be configured to process the received image data based on, for example, specific image processing algorithms stored in memory 130 in the form of processor-executable instruction sequences. The image processing circuitry 120 may then provide processed image data 135 to memory 130 for storage and/or to display 150 for viewing. It should be appreciated that memory 130 may include any combination of different memory storage devices, such as a hard drive, random access memory, read only memory, flash memory, or any other type of volatile and/or nonvolatile memory. It should further be appreciated that memory 130 may be implemented as multiple, discrete memories for storing processed image data 135, as well as the processor-executable instructions for processing the captured image data 125.

The display 150 may comprise a display, such as a liquid crystal display screen, incorporated into the camera 100, or it may alternatively be any external display device to which the camera 100 may be connected. The camera further comprises an motion sensing circuitry 140 (e.g., accelerometer, gyro, etc.) for providing motion-related data to image processing circuitry 120.

Figure 2:
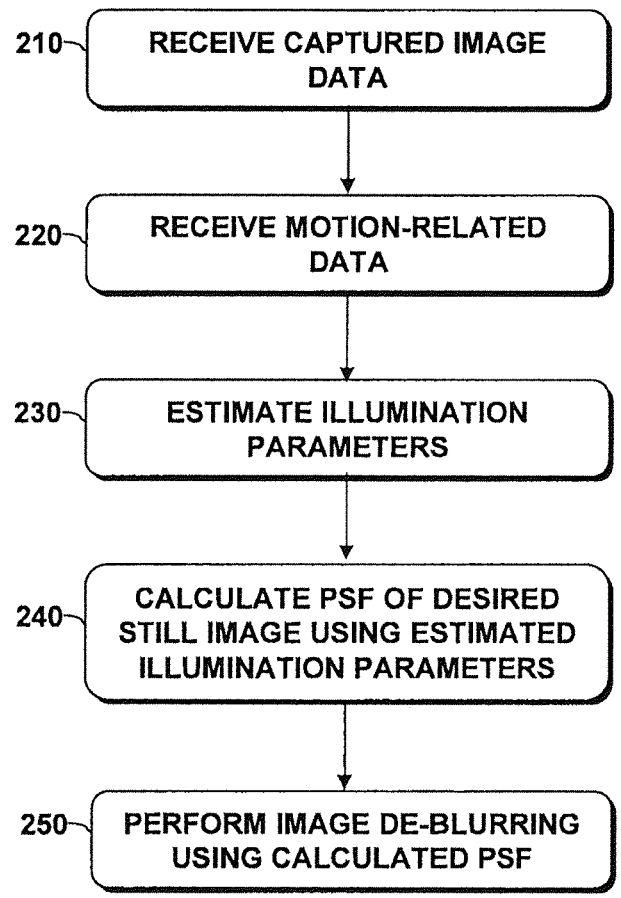
FIG. 2 depicts one embodiment of a process for implementing one or more aspects of the invention.

Referring now to FIG. 2, depicted is one embodiment of a process 200 for carrying out one or more aspects of the invention. In certain embodiments, process 200 may be performed by one or more processors (e.g., image processing circuitry 120 of FIG. 1) of a digital camera (e.g., camera 100 of FIG. 1). Process 200 begins at block 210 where captured image data is received. The captured image data may be a sequence of image frames $k_{1-N}$ captured by a digital camera's image capturing system (e.g., image capturing system 110) over some period of time, such as prior to and/or after capturing a desired still image. In one embodiment, the image frames $k_{1-N}$ may be captured during a preview mode.

With respect to the process of capturing the image frames $k_{1-N}$, in certain embodiments it may be desirable to choose a frame period such that for every $1 \leq k < N$, k times the frame period is not an integer multiple of the period of the light signal.

Process 200 may continue to block 220 where motion-related data corresponding to the period of time when image frames $k_{1-N}$ were captured may be received. While in one embodiment, the motion-related data may be provided using a built-in accelerometer or gyro-type circuitry (e.g., motion sensing circuitry 140 of FIG. 1). Other known means for providing motion-related data may be similarly used.

Process 200 may then continue to block 230 where illumination parameters may be estimated. Optionally, the motion-related data from block 220 may be used to perform alignment between the captured image frames $k_{1-N}$. In any event, illumination parameters, such as intensity, contrast, frequency, and phase, may be estimated at block 230 for each of the captured image frames $k_{1-N}$. Various embodiments of how the illumination parameters may be estimated are described in detail below with reference to FIG. 3.

Continuing to refer to FIG. 2, process 200 may then continue to block 240 where the PSF for the desired still image may then be calculated. In certain embodiments, the estimated illumination parameters from block 230, together with the motion-related data from block 220 acquired at the point in time corresponding to when the desired still image was captured, may be used to calculate the PSF of the desired still image. In particular, if an image point with brightness B spends time dt at pixel (x,y) while the light intensity is I, it contributes B*I*dt to the pixel value. Let is denote by $v_x[i]$ and $v_y[i]$ the x- and y-components of the velocity of an image point, where such components are captured at block 220. The PSF may then be calculated as follows:

```
Initialization:
H[n,m] = 0 for all n,m;
x = 0;
y = 0;
for (i=1; i<=N; i++) {
    x = x + v_x[i] · dt;
    y = y + v_y[i] · dt;
    m = round(x);
    n = round(y);
    H[n,m] = H[n,m] + I[i] · dt;
},
    where I[i] is the light intensity at time interval i.
```

Once the PSF has been calculated at block 240, process 200 may then continue to block 250 where the actual image de-blurring process may be performed (e.g., by image processing circuitry 120) to produce a processed output image to either an electronic memory (e.g., memory 130) and/or to a display (e.g., display 150). By way of providing a non-limiting example, such image de-blurring may be performed using a type of de-convolution algorithm, such as Wiener filtering. With Wiener filtering, an inverse filter is calculated from the PSF and then applied to the blurred image to produce a de-blurred image. In this fashion, certain embodiments of the invention provide the possibility to perform image de-blurring under flickering lighting conditions.

Figure 3:
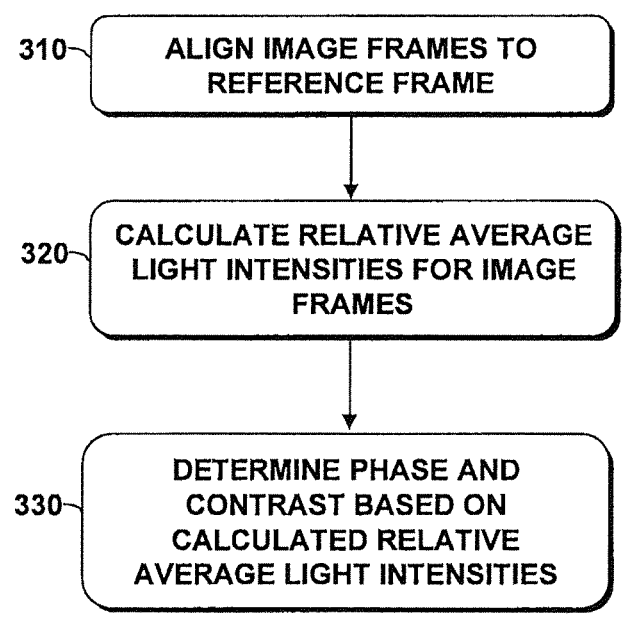
FIG. 3 depicts another process for implementing one or more aspects of the invention, according to one embodiment.

Referring now to FIG. 3, depicted is a process 300 for performing the illumination parameter estimation of block 230 of FIG. 2. Process 300 begins at block 310 where the captured image frames $k_{1-N}$ are aligned, such as to a reference frame. In certain embodiments, this operation may be performed using motion-related data corresponding to the period of time when the image frames $k_{1-N}$ were captured, as described above in block 220 of FIG. 2. In any event, regardless of how the captured image frames $k_{1-N}$ are aligned, process 300 may then continue to block 320 where the relative average light intensities for the captured image frames $k_{1-N}$ may be calculated.

With respect to calculating the relative average light intensities at block 320, a sinusoidal model of the light intensity with twice the frequency of the power outlet may be assumed. As such, the intensity of a fluorescent light at time equals t may be calculated as follows:

$$I(t)=I_o[1+\alpha \cos(2\omega t+\phi)], \quad (1)$$

where, $I_o$=average intensity;
$\omega$=frequency of power outlet;
$\phi$=phase; and
$\alpha$=contrast.

The unknowns in Equation (1) are the phase $\phi$, contrast $\alpha$, and sometimes the frequency $\omega$. Since the intensity at every moment is proportional to $I_o$, $I_o$ cancels out and is therefore not significant for the calculations described herein.

After appropriate alignment between the images, the relative average illumination intensities $B_k$ during the exposure of each image can be estimated based on a comparison between the images. By way of providing a non-limiting example, one way to calculate the average light intensities $B_k$ is to take all pixels that belong to the intersection of all captured image frames $k_{1-N}$ and calculate the average pixel value of each image in that intersection. The values of $B_k$ would be then proportional to the average pixel values.

Another example of how one might calculate the relative average illumination intensities $B_k$ is to assume that the amount of light incident at a point with coordinates [i,j] in some common reference frame during the exposure of a captured image frame #k is $B_k \cdot L[i,j]$, and the reflectance of point [i,j] is $R_0[i,j]$. Then the value of the pixel in image frame #k corresponding to the point with coordinates [i,j] in the common frame of reference may be given by $I_k[i,j]=B_k \cdot L[i,j] \cdot R_0[i,j]$. Additionally, one may define $R[i,j]=L[i,j] \cdot R_0[i,j]$ and call $R[i,j]$ the effective reflectance of point [i,j].

Given the above defined relationships, the following can be denoted:

$$f_k[i, j] = \begin{cases} 1 & \text{if point } [i, j] \text{ belongs to frame } \#k \text{ and, in addition,} \\ & \text{the corresponding pixel is neither overexposed nor underexposed} \\ 0 & \text{else,} \end{cases}$$

$$\text{and } \tilde{f}_k[i, j] = \sum_{n \neq k} f_n[i, j].$$

Furthermore, for each image let us define the set $A_k$ of points [i,j] which (1) belong to a particular frame image #k, and (2) belong to at least one frame other than image frame #k:

$$A_k=\{[i,j] | f_k[i,j]=1 \text{ and } \tilde{f}_k[i,j] \geq 1\}.$$

Next, one may calculate the estimate of effective reflectance at point [i,j] in $A_k$ either using a particular image frame #k:

$$r_k[i, j] = \frac{1}{B_k} I_k[i, j],$$

or
using all other image frames other than #k:

$$\tilde{r}_k[i, j] = \sum_{n \neq k} \frac{1}{B_n} \frac{I_n[i, j]}{\tilde{f}_k[i, j]}.$$

Note that in the latter calculation of reflectances equal weights have been assigned to all images for which $f_n[i,j]=1$.

Additionally, a vector u and matrix M may be defined such that:

$$u_n = \frac{1}{B_n}, \text{ and}$$

$$M_{kij,n} = \begin{cases} I_k[i, j] 1_{\{[i,j] \in A_k\}} & \text{if } n = k \\ -\frac{I_n[i, j]}{\tilde{f}_k[i, j]} 1_{\{[i,j] \in A_k\}} & \text{if } n \neq k. \end{cases}$$

There is a vector u* that minimizes the following cost function:

$$CF = \sum_k \sum_{[i,j] \in A_k} (r_k[i, j] - \tilde{r}_k[i, j])^2 = \sum_{k,i,j} \left( \sum_n M_{kij,n} \cdot u_n \right)^2 = (Mu)^T (Mu).$$

Specifically, the solution u* is the eigenvector of $M^T M$ corresponding to the minimum eigenvalue. Alternatively, to achieve robustness to outliers or mixed illumination, more robust regression techniques may be applied (e.g., weighted least squares, RANSAC, etc). Once the vector u* has been found, the relative average light intensities during the exposure of each image frame #k may be calculated as follows:

$$B_n = \frac{1}{u_n}.$$

Regardless of the technique used, once the relative average illumination intensities $B_k$ for the image frames $k_{1-N}$ is known, process 300 may continue to block 330 where phase, contrast and potentially other illumination parameters may be determined.

Assuming that the light source intensity may be given by Equation (1) above, and further assuming that the exposure of image frames $k_{1-N}$ starts at $ts_k$ and ends at $te_k$, such that $\Delta t = te_k - ts_k$, it follows that the intensity of a particular image frame (k) is proportional to:

$$J_k = I_o \int_{ts_k}^{te_k} [1 + a\cos(2\omega t + \varphi)] dt, \text{ also expressed as}$$

$$= I_o \left\{ \Delta t + \frac{a}{2\omega} [\sin(2\omega te_k + \varphi) - \sin(2\omega ts_k + \varphi)] \right\}.$$

Thus, it follows that $B_k = \alpha J_k$, for some $\alpha$, and a system of N equations is available of the form:

$$B_k = (\alpha I_o) \cdot \left\{ \Delta t + \frac{a}{2\omega} [\sin(2\omega t e_k + \varphi) - \sin(2\omega t s_k + \varphi)] \right\}, \quad (2)$$

where each of $\alpha I_o$, $\phi$, $\alpha$, and $\omega$ are unknown (although frequency $\omega$ may be known).

With respect to solving for the value $\alpha I_o$, it is noted that the number of frames N should be large enough such that:

$$\frac{a}{2\omega} \sum_{k=1}^{N} [\sin(2\omega t e_k + \varphi) - \sin(2\omega t s_k + \varphi)] << N \cdot \Delta t.$$

Then the average value of $\{J_k\}$, k=1, ..., N, is $\overline{J_k} = I_0 \Delta t$. And therefore, $$\alpha I_0 = \frac{\overline{B_k}}{\Delta t}. \quad (3)$$

Given that there will be a sufficient number of equations that are not interdependent, the system of N equations may be readily solved at block 330 for the illumination parameters of phase ($\phi$), contrast ($\alpha$) and even frequency ($\omega$) if not known.

While one aspect of the disclosure is to utilize the estimated illumination parameters to calculate the appropriate PSF of a desired image for de-blurring purposes, another aspect of the invention is to use the aforementioned estimated illumination parameters to synchronize the exposure timing of a still image to the time when there is the most light. In particular, if the exposure duration of a still image is short compared to the illumination oscillation period, and the contrast ($\alpha$) of the oscillation in Equation (1) is significant, the amount of light and hence the signal-to-noise ratio for the still image will depend on the exact timing of the exposure. Thus, once the illumination phase ($\phi$) has been estimated, the exposure can be specifically chosen to occur when the lighting intensity is at or near its maximum.

Still another aspect of the invention is to use the aforementioned estimated illumination parameters for motion estimation in view/video modes. Specifically, when motion estimation is performed in view/video modes (for example, for the purpose of video stabilization) and the illumination is time-varying, motion estimation techniques that are insensitive to illumination changes (such as normalized cross-correlation based techniques) should be used. However, such techniques tend to be more computationally and power intensive than simpler ones that can assume the illumination remains constant between frames. Therefore, by normalizing the intensity of a specific frame by its estimated illumination, it is possible to use the simpler techniques for motion estimation.

Since the illumination parameters change at a rate that is much slower than the frame rate, it is possible to perform the illumination parameter estimation process described herein on a periodic basis (e.g., only once every x number of frames). Use of the estimated parameters would materially simplify the motion estimation process, and thereby reduce the computational overhead.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A non-transitory processor storage device having code segments stored thereon that when executed by a processor performs actions, comprising:
   receiving first image data associated with a plurality of image frames captured during a first time period under flickering light conditions;
   estimating one or more illumination parameters based on the first image data, including relative average light intensities for each of the plurality of image frames;
   using the estimated one or more illumination parameters to synchronize an exposure timing for capturing second image data associated with a desired still image captured at a second time period under flickering light conditions, the exposure timing being selected to occur when it is estimated that an intensity of the flickering light conditions is at a maximum value;
   using the estimated one or more illumination parameters to calculate a point spread function (PSF) for the desired still image;
   determining an inverse filter from the PSF; and
   using the inverse filter to de-blur the desired still image.

2. The non-transitory processor storage device of claim 1, wherein calculating the PSF further includes using motion-related data associated with the first time period.

3. The non-transitory processor storage device of claim 1, wherein the processor performs other actions, including:
   using the estimated one or more illumination parameters to estimate motion in the plurality of image frames.

4. The non-transitory processor storage device of claim 1, wherein the estimated one or more illumination parameters includes at least one of an intensity, contrast, frequency, or phase of the flickering light conditions.

5. The non-transitory processor storage device of claim 1, wherein the plurality of images are captured over a frame period that is determined as other than an integer multiple of a period of the flickering light conditions.

6. The non-transitory processor storage device of claim 1, wherein the processor performs other actions, including:
   receiving motion-related data for first time period; and
   employing the motion-related data to perform alignment of the images captured during the first time period.

7. An article of manufacture, comprising:
   an image capturing system having at least an optical lens for capturing images under flickering light conditions; and
   one or more circuits coupled to the image capturing system to perform actions, including:
      receiving first image data associated with a plurality of image frames captured during a preview mode time period under flickering light conditions;
      estimating one or more illumination parameters based on the first image data, including relative average light intensities for each of the plurality of image frames;
      using the estimated one or more illumination parameters to synchronize an exposure timing for capturing second image data associated with a desired still image captured at a second time period under flickering light conditions, the exposure timing being selected to occur when it is estimated that an intensity of the flickering light conditions is at a maximum value;
      using the estimated one or more illumination parameters to calculate a point spread function (PSF) for the desired still image;

determining an inverse filter from the PSF; and
using the inverse filter to de-blur the desired still image.

8. The article of manufacture of claim 7, wherein the plurality of images are captured over a frame period that is determined as other than an integer multiple of a period of the flickering light conditions.

9. The article of manufacture of claim 7, wherein the estimated one or more illumination parameters include at least one of an intensity, contrast, frequency, or phase of the flickering light conditions.

10. The article of manufacture of claim 7, wherein calculating the PSF further includes using motion-related data associated with the preview mode time period.

11. The article of manufacture of claim 7, wherein the one or more circuits perform actions, further including:
  receiving motion-related data for the preview mode time period; and
  employing the motion-related data to perform alignment of the images captured during the preview mode time period.

12. The article of manufacture of claim 7, wherein estimating the intensity of the flickering light conditions is based on at least estimating a phase of the flickering light conditions.

13. A digital camera, comprising:
  a memory for storing at least first image data; and
  at least one processor arranged to perform actions, including:
    receiving first image data associated with a plurality of image frames captured during a first time period under flickering light conditions;
    estimating one or more illumination parameters based on the first image data, including relative average light intensities for each of the plurality of image frames;
    using the estimated one or more illumination parameters to synchronize an exposure timing for capturing second image data associated with a desired still image captured at a second time period under flickering light conditions, the exposure timing being selected to occur when it is estimated that an intensity of the flickering light conditions is at a maximum value;
    using the estimated one or more illumination parameters to calculate a point spread function (PSF) for the desired still image;
    determining an inverse filter from the PSF; and
    using the inverse filter to de-blur the desired still image.

14. The digital camera of claim 13, wherein calculating the PSF further includes using motion-related data associated with the first time period.

15. The digital camera of claim 13, wherein estimating the intensity of the flickering light conditions is based on at least estimating a phase of the flickering light conditions.

16. The digital camera of claim 13, wherein the at least one processor is arranged to perform actions, further including:
  receiving motion-related data for first time period; and
  employing the motion-related data to perform alignment of the images captured during the first time period.

17. The digital camera of claim 13, wherein the plurality of images are captured over a frame period that is determined as other than an integer multiple of a period of the flickering light conditions.

* * * * *